United States Patent [19]

Reppert

[11] 3,989,307

[45] Nov. 2, 1976

[54] STAMPED AUTOMOTIVE WHEEL

[75] Inventor: Merlyn R. Reppert, Torrance, Calif.

[73] Assignee: W. R. Grace & Co., New York, N.Y.

[22] Filed: Jan. 6, 1975

[21] Appl. No.: 538,477

Related U.S. Application Data

[62] Division of Ser. No. 420,109, Nov. 29, 1973, Pat. No. 3,874,054.

[52] U.S. Cl. ............................................. 301/64 R
[51] Int. Cl.² ......................................... B60B 1/06
[58] Field of Search ....... 29/159.01, 159.02, 159.03, 29/159.3; 12/405, 379; 301/63 R, 63 D, 64 R, 64 SD, 79

[56] References Cited
UNITED STATES PATENTS 2,088,992   8/1937   Bierwirth .......................... 29/159.01
3,664,000   5/1972   Le Jeune .......................... 29/159.01

Primary Examiner—Robert B. Reeves
Assistant Examiner—H. Grant Skaggs
Attorney, Agent, or Firm—William Kovensky; Kenneth E. Prince

[57] ABSTRACT

A polished steel wheel center with hub, outward-spreading spokes, and rim; the metal having substantially the same thickness throughout; the ratio of the center diameter to the hub height being substantially 5; the center having slots intermediate the outer areas of the spokes; the center having deeply recessed lug pockets intermediate the spokes; the terminus of the rim, the bottom of the lug recesses, and the bottom of the hub being in substantially the same plane; the slots being in a plane intermediate top and bottom of the hub.

10 Claims, 18 Drawing Figures

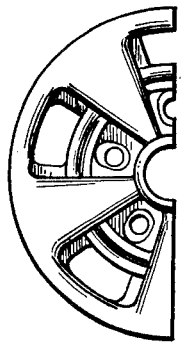
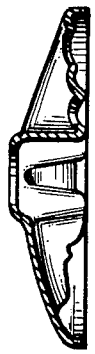
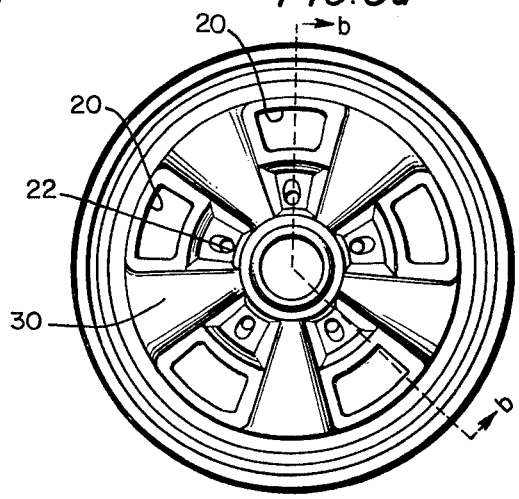
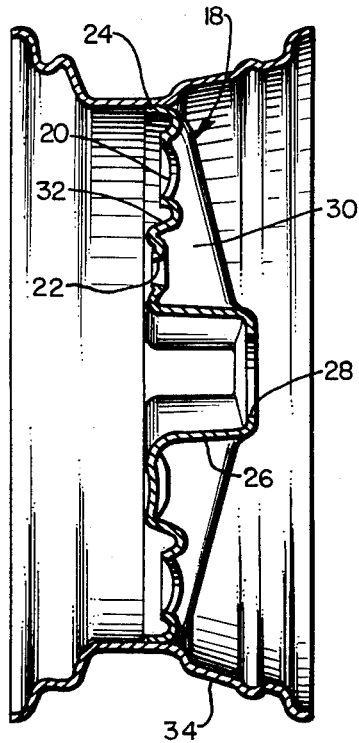
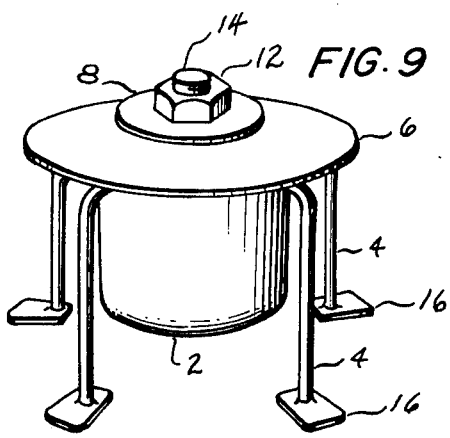
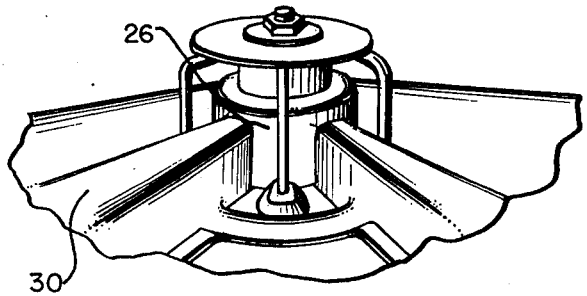

STAMPED AUTOMOTIVE WHEEL

This application is a division of my copending application Ser. No. 420,109, filed Nov. 29, 1973 and now U.S. Pat. No. 3,874,054, entitled "WHEEL PROCESS", assigned to the same assignee as the present application, and issued on Apr. 1, 1975 as U.S. Pat. No. 3,874,054.

This invention is directed to an improvement in the manufacture of automobile wheels, and more particularly concerns a method for forming the center of the wheel, together with electroplating same.

It is known to form an automobile wheel by stamping a center, followed by forming, polishing, plating, and welding the center into a plated rim. These wheel centers of the prior art, however, are relatively shallow, and offer no problems with regard to subsequent polishing steps to prepare the centers for electroplating. That is to say, all areas of these prior centers were accessible to polishing equipment. The same is not true for centers which have been subjected to deep drawing operations. By deep drawing is meant that the lug pockets are so deeply recessed that they are not accessible to conventional polishing machinery. As a matter of fact no prior processes have been available to make suitable deeply drawn wheel centers. By the process of this invention these and other problems have been solved. For example, for the first time, using the process of this invention it is possible to form a wheel center in which the lug pockets contain enough metal and are sufficiently strong to be punched to standard size lug holes. Also these wheel centers can be electroplated, using the process of this invention. Prior to this invention such deeply drawn lug pockets, even had they existed, could not have been suitably electroplated.

My wheel forming process is directed to the wheel center. Its ultimate attachment to the rim is conventional. In making a deeply drawn platable wheel center my invention requires three crucial operations. The first of these operations is that the strip stock be prepolished. (If it is not prepolished, even if the other steps are carried out, the resulting wheel center cannot be properly electroplated.) The second crucial operation is actually a series of operations carried out in a sequence of die presses. It is extremely important in this series of operations that the blank be initially very deeply drawn, i.e., forming a "hat" blank, with the depth of the draw being at least about one-quarter of the diameter of the blank, and the diameter of the draw being approximately five-sixths the diameter of the blank. This initial step gives sufficient depth of metal for the subsequent spoke forming steps and for lug pocket forming steps. If this deep draw is not made a weak lug pocket will result which will not have enough metal thickness to be stamped (i.e., pierced to form lug hole), or which may even crack during the forming processes. As a third crucial point the hub area, i.e., the center of the wheel center, must be reduced in height over several successive die forming operations.

Finally, as a fourth greatly preferred step, in the electroplating step, I use a "collector" in association with the wheel center to insure that the lug pockets will be adequately plated. These steps constitute the improvements in my process over and above the standard and well known procedures of the prior art for making automobile wheels of the stamped and plated type. These steps are to be superimposed on the known conventional procedures.

In the figures,

FIGS. 1/1a–7/7a inclusive show successive stamping, drawing, and forming steps whereby the wheel center is made. In this sequence of figures, 1, 2, etc., show half of the center in top plan view.

FIGS. 1a, 2a, etc., show the corresponding sections.

FIG. 8a shows a finished wheel comprising rim and center, and

FIG. 8b shows a section taken along the lines b—b.

FIG. 9 shows a perspective view of the collector which is used in electroplating.

FIG. 10 shows a perspective view of the collector of FIG. 9 mounted in a center ready to carry out the electroplating operation.

STRIP STOCK

Figure 1:
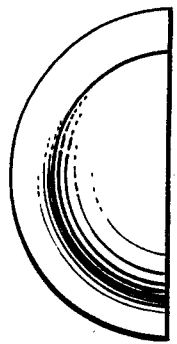
Figure 1A:
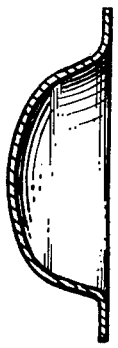

The blanks, i.e., the strip stock, were 16 inches × 96 inches and in thickness 0.168 inch. One such blank makes six wheels. This is a standard type of steel available commercially identified as hot rolled steel, pickled and oiled. The stock material is not critical. For example, aluminum-killed steel, rimmed steel, and draw quality steel are suitable.

PREPOLISHING

Each sheet of stock is polished. I prefer to do this by and each sheet through six different polishing operations. The grinding equipment is conventional. Preferably, six machines are used, one for each of the six polishing operations. Each machine suitably carries a circular polishing belt vertically positioned. The work piece is fed through the machine by means of two sets of duplicate pinch rolls on the incoming side. The leading edge of the work piece proceeds between the polishing belt and a pressure roll. The pressure roll presses the work piece against the polishing belt. Four pinch rolls pick up the work piece as it emerges from the grinding belt and drop it in a stack on a work table. The machine suitably is equipped with a dust collector, since the combination of metal removed from the surface of the work piece and the abrasive material removed from the polishing belt is considerable. When I use 16 inch-wide stock, I prefer that the dimensions of the polishing belt be 18 inches wide by 126 inches in total length. The belt is, of course, endless. As stated, these finishing operations proceed through six separate steps, one for each of the series of six machines. The first machine uses No. 150 aluminum oxide grit. After all the stock strips of a given piece are passed under the belt of the first machine (approximately 40 strips) the belt is transferred to the second machine and is thus reused on all of the strips once more. A new 150-grit belt is put on the first machine. In the second machine the used belt acts as further finishing means. In the third polishing machine a new belt of No. 220 grit aluminum oxide is used. All the work is passed under this belt for step No. 3. For step No. 4 the same belt (now used) is used once more on the number four machine for all of the work pieces. For step No. 5 a belt using No. 220 grit of silicon carbide is placed on the number five machine. All the stock pieces are passed under this belt for step No. 5. For step No. 6 the used belt from the number five machine is placed on the sixth and last machine, and all of the stock strips are passed under same. Thus six steps and six machines in all are used, but only three grades of polishing belts.

New belts are used on the first, third, and fifth machines, and the used belts are transferred respectively to the second, fourth and sixth machines. They are discarded after the latter use.

The stock strips coming off the last belt have a surface which is sufficiently polished to accept nickel electroplating, even after forming, drawing, stamping, etc. as will be hereinafter explained. I aim at a finish in the range of about No. 8–16. Such finish can, of course, be attained by polishing means other than that described and well known to those skilled in the polishing art. It is the finish that counts, and not how it was obtained.

Polishing machinery is available commercially for the polishing operations. I used a machine made by the Acme Manufacturing Co. of Detroit.

As has been explained, it is essential for the subsequent nickel and chrome electroplating operations that the stock strips achieve a very fine finish at the outset before any subsequent stamping, etc. operations are commenced. In addition to providing a suitable surface for eventual electroplating, prepolishing also provides immediate benefits in that it removes mill scale and aids in the operation of the die lubricant in operations in the die shop below described.

STAMPING, DRAWING, FORMING, ETC.

The following concerns operations in the die shop.

The first step is to stamp out and draw the "hat" blank as shown in FIG. 1/1-a. This is accomplished by a die having the indicated configuration, in a press of, for example, 500 Tons. As noted, this operation gives a blank with a deeply drawn and elevated interior. This area is drawn to an extent far greater than will be necessary in the subsequent finished wheel. The reason for this great depth of draw is that a considerable excess of metal must provided for the steps hereinafter explained wherein the lug pockets are formed. In overall diameter this piece is about 12.5 inches and in depth about 3¾ inches. The dome of the hat is about 10 inches in diameter.

Figure 2:
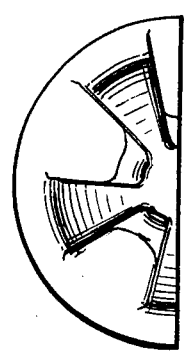
Figure 2A:

In step No. 2 (see FIGS. 2/2a) the second die presses down in what will become the 5 lug pockets. In this step the proto-spoke areas are formed as "gathers". This step slightly increases the diameter of the blank, to about 12⅛ inches, while simultaneously reducing the center height, to about 3-3/16 inches. In this operation the beginnings of the lug pockets are formed. Also there may be evident in this step some ripples in the proto-spokes. The lug pocket areas are formed in the same plane with the periphery, and approach the center hub area for about 3¼ inches before merging into the hub area. The hub or center area itself is about 3 inches in diameter. Providing enough metal to make the lug pockets results in an excess of metal in the spoke and hub areas. Hence in the subsequent steps the forming operations must include compression to reduce this excess metal.

Figure 3:
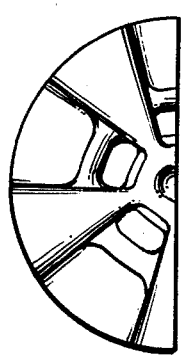
Figure 3A:

In step No. 3 (see FIGS. 3-a/3a) the third die makes a further indentation into the lug area while at the same time compressing down the hub area and the spoke areas. It would not be possible to make this necessary indentation into the lug areas if it were not possible to compress further the hub area and the spoke areas, since the latter areas are in effect reservoirs of metal needed to make the indentations into the lug areas. At this point it may be noted that if the initial deep drawing for blanks Nos. 1 and 2 had not been carried out, the final deep indentations contemplated for the lug areas in steps 4 and subsequent would not be possible, for the reason that the lug areas otherwise would have been too thin to permit stamping out the lug holes. Step No. 3 gives a blank which is again increased in diameter, e.g., to about 13⅛ inches. The hub area is further compressed, and now has a height of about 2¾ inches. The lug areas further approach the center, and are now slightly below the peripheral plane. The extreme "edge" of the lug area may measure 4½ inches from the periphery to the center.

Figure 4:
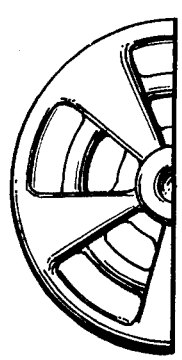
Figure 4A:
Figure 5:
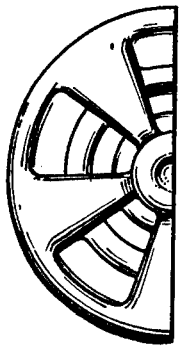
Figure 5A:

Continuing with blank No. 4 (see FIGS. 4/4a) it will be seen that at this step the wheel has very nearly achieved its final form. The geometry of the wheel has been finalized, except that the lug bosses have not yet been formed nor have the 5 rim slots been stamped, nor the hub hole. The spokes and hub have been brought down to their final height. In this step No. 4 the die turns the peripheral rim down to give a ⅝ inch peripheral depth. This rim may have a ¼ inch straight side. The lug area is now about ½ inch below the annular rim. The center diameter has now been reduced to 12⅜ inch and the center height has been reduced to 2½ inches, i.e., ratio of substantially 5 to 1.

In some instances, the upper surfaces of the spokes from step 4 may have a slight ripple. If the ripple is present it is barely detectable by touch or eye. It is readily removed by a pressing step, with a die designed particularly for pressing the spoke surfaces, in step No. 5. Pieces Nos. 4 and 5 are substantially the same except for the ripple, if any.

Figure 6:
Figure 6A:

Continuing on to blank No. 6 (see FIGS. 6/6a), at this step the lug bosses are created by raising central sections of the lug areas about 5/16 of an inch. This, of course, requires a considerable amount of metal. However, this metal is available by reason of the preceding series of deep draws. These lug bosses have to be formed as a separate operation. This step cannot be combined with the step of forming the final lug recess. In proceeding from blank No. 3, if it is attempted to form simultaneously the ultimate lug recesses and the lug bosses, the metal will be ruptured. In blank No. 6 also the hub hole is stamped out.

In the final step, No. 7, see FIGS. 8a and 8b the peripheral arcuate (rim) slots 20 and the lug holes 22 are pierced. The lug areas can of course be pierced for holes to fit different size hubs on different cars, for example Chevrolets, Ford, Pontiacs, and the like.

As shown in FIGS. 8a, 8b and 10, as well as in the other figures, the wheel center 18 comprises a downturned, when facing towards the vehicle wheel on which the invention wheel will be mounted, rim 24 which comprises the outer periphery of the center 18. At its middle, the wheel comprises an upwardly extending hub portion 26 formed with a central opening 28. As shown in the drawings, and as is described elsewhere herein, the ratio of the height of the hub 26 to the diameter of the flange 24 is substantially 1 to 5. Extending from the hub portion 26 out to the peripheral rim portion 24, wheel center 18 comprises a plurality of spoke portions 30. These slope bottomwardly and radially outwardly from the hub to the rim, and also have a relatively flat top surface, and join into the hub portion 26 at their inside ends.

Means are provided to carry the lug openings 22. To this end, wheel center 18 is formed with a wall 32 between each two spoke portions 30, which together with the side wall of the hub 26 defines a relatively deep well or pocket 34, at the bottom of each of which is formed a lug opening 22. The bottom of this pocket is the boss portion which may be coined and pierced to form the lug opening 22. Opening 22 itself may be tapered, as required, for any particular use.

The bottoms of the rim portion 24, the wells or pockets in which the lug holes 22 are formed, and the bottom end of the hub portion 26 are all substantially co-planar, as can be clearly seen in FIG. 8*b*. This structure defines the depth of the well carrying the lug openings 22, as well as serving as the base from which the height of the hub portion 26 is defined.

To complete a vehicle wheel, the center 18 is finally welded or otherwise suitably joined into a standard rim 34, thereby constituting a complete wheel. That is, the invention center 18, plus a conventional rim 34, constitutes a useful vehicle wheel.

The lug holes may be ⅝ inch at the bottom (facing the car), tapering to ¾ inch at the top. The lug holes are coined and tapered at this step. After step 7 the wheel can be taken direct to final polishing and plating. The lug holes are punched to provide a conical opening. This is desirable in mounting the wheels using conventional lugs, which are of course conical in terminal section. The entrance angle into the lug holes is, of course, adapted to the angle of the lugs intended to be used with the wheels.

After step 7 the wheel can be taken direct to polishing and plating operations.

Conventional die lubricant is used in all die operations, and the final product from the stamping plant is thus coated with a thin film of die compound. This film is permitted to remain while the center is in storage. However, prior to the nickel and chromium plating operation this film must be removed. This is customarily done by agitation in a caustic bath followed by a water rinse, and acid bath, and a second water rinse.

Five hundred ton presses in series are suitable for carrying out the forming operations described in this section, except for Step 5, for which a 2000 or 2500-ton press is recommended.

All the above steps are done cold. Hot working is not necessary.

As noted, it is crucial to the entire series of steps following step 1 that metal be made available to the forming operations by compression of already drawn metal. Only in this way can the great height/depth differences in spoke, hub area, and lug area be retained with good structural strength.

SUPPLEMENTAL POLISHING

The wheel center is now put through additional polishing operations prior to plating. These operations comprise roughing and buffing. However, only the spoke and peripheral areas (annular rings) are polished, since these are the only areas that can be reached by the polishing equipment. The lug areas are too deep to be affected. These operations are carried out in order to blend out the die marks on the tops of the spokes and in the peripheral area. The roughing operation on the spokes is suitably done in two steps, the difference being that the first step is done with a medium-grade abrasive and the second is done with a finer abrasive. Both of these steps involve the use of a conventional cloth and emery polishing wheel. A polishing stick consisting of medium-grade tallow and emery is fed into the wheel simultaneously with exposure of the spoke areas to the polishing wheel.

The buffing operation likewise suitably uses two steps. One man can buff the peripheral areas, then can hand the wheel center to the second man who buffs the spoke areas. More buffing area is covered than in the roughing steps.

THE PLATING OPERATION

The electroplating steps are three. The cleaned piece is plated with a first coating of nickel, then a second coating of nickel (in a distinctly independent operation) and finally with a coating of chromium metal. These electroplating operations are standard in the art. They are used, for example, to plate numerous types of automotive accessories, e.g., bumpers, molding strips, door handles, and the like. The function of each electroplating coating is well known. The first plating of nickel levels the surface of the piece, i.e., pits and scratches are filled in and the surface is generally levelled. The second nickel coating is thicker, and provides very high resistance to corrosion. The coating of chromium metal is added to provide resistance to scratching, such as may result when the car is washed or the wheel is polished by hand, etc. This coating of chrome metal is fairly critical and is generally less than 0.0001 inches thick. If it is plated any thicker its inch would be rather dull, since chromium metal is a gray color in thick layers. If it is any thinner it cannot adequately protect the upper coat of nickel from scratches, etc. The nickel coatings themselves are very carefully controlled. Too much nickel results in a rough surface, and not enough nickel would show scratches and polishing lines from the steps preceding the plating operation. If there is not enough chromium the underplated area would tend to turn yellow very quickly.

As stated, these plating baths are standard. We prefer, however, the following concentrations of salts in the three respective baths, and the amperage as stated.

|  | Metal Concentration | Amperage | Time in Bath (Minutes) |
| --- | --- | --- | --- |
| First Nickel Bath | 12 ounces/gal. | 50 amps/sq.ft | 18 min., 12 sec. |
| Second Nickel Bath | " | " | 2 min., 48 sec. |
| Chromium Bath | 44 ounces/gal. | 200 amps/sq.ft. | " |

In these plating operations the use of my electrolytic collector is essential. This is described below.

THE ELECTROLYTIC COLLECTOR

The electrolytic collector (see FIG. 9) comprises a plug 2, a plurality of legs 4, a base plate 6, and washer 8 held together by nut 12 and bolt 14. Each of the legs 4 has a foot 16. The legs 4 and the feet 16 are painted to insulate them from the electrolytic bath. However, the bottom of each foot 16 is unpainted and does not in fact conduct the electric current. The legs are in electric contact with the metal base plate 6. The feet 16 are preferably formed of titanium metal, and their bottoms are preferably platinum plated. The function of the collector is to attract nickel and chromium ions into the deep lug pockets thereby to provide a coating of metal in these areas, as thick as that given to the more accessible spoke and peripheral areas. The material of plug 2 can be plastic (i.e., polyvinylchloride) or wood, or the like. The material is not critical so long as it fits into the hub hole and provides good electrical insulation.

In FIG. 10 the collector is shown in position in the polished center, ready to be taken through the nickel and chromium electrolytic plating steps.

An essential consequence of this entire series of steps is that it yields a wheel center which can be adequately plated. No other wheel center made by forming and drawing, so far as is known, can be adequately plated.

To state this another way, the initial polishing operation of the blank above referred to places the ultimate lug pockets in condition for plating. This is crucial, since absent such prepolishing, if these deeply indented lug pockets, in a rough pre-formed condition were plated by the standard technique, the plating would not adequately seal the pores of the metal, and after a few months of service under road conditions, the lug area would show signs of rust.

Although all the description herein refers to a 5-spoke wheel, this is obviously not critical. It can be used also to make a 4-spoke wheel, for example, Pinto, many foreign imports, and the like. Additionally in the larger categories the same technique can be used to make a 6-spoke wheel.

The final step of welding the center into the wheel rim is also standard, and equipment and procedures for accomplishing this are conventional in the art. It may be stated in general that the waiting rim has already been plated. The plated center (prepared by the process of this invention) is pressed into the plated rim, is aligned, and then it is welded using a short arc. This gives the final wheel ready for installation on the automobile.

What is claimed is:

1. A one piece stamped steel automotive wheel center having an upwardly extended hub portion, a plurality of outward-spreading spoke portions, and a rim portion; the metal having substantially the same thickness throughout and with a substantially ripple-free top surface; the ratio of the center diameter to the hub height being substantially 5; the center having slots intermediate the outer areas of the spokes; the center having deeply recessed lug pockets intermediate the spokes with a lug hole formed in a boss formed at the bottom of each of said lug pockets, the spokes slanting from the hub to the rim; said rim portion being turned down; the terminus of the downturned rim portion, the bottoms of the lug recesses, and the bottom of the hub being in substantially the same plane; the slots being in a plane intermediate top and bottom of the hub; and said center having a top surface sufficiently polished to permit nickel and chromium electroplating.

2. The wheel center of claim 1, further comprising at least one substantially uniform layer of nickel electroplated over said entire top surface including all of said lug recesses, and at least one substantially uniform layer of chromium electroplated over said at least one layer of nickel.

3. A one piece stamped steel automotive wheel center comprising a central upwardly extending hub portion, a peripheral portion, and a plurality of spoke portions interconnecting the peripheral and hub portions; said spoke portions comprising top faces extending from locations closely adjacent the topmost end of the hub portion downwardly and radially outwardly to the peripheral portion, a downwardly extending lug pocket portion between adjacent spoke portions and adjacent said hub portion; the bottommost end of said peripheral portion, the bottoms of said lug pocket portions, and the bottommost portion of said hub portion all being substantially co-planar to thereby define a bottom plane of said wheel center; the entire top face of said center being sufficiently polished to permit nickel and chromium electroplating thereon; and the dimension of said hub portion from said bottom plane to said topmost end being at least one-fifth the diameter of said peripheral portion.

4. The wheel center of claim 3, wherein said center consists of substantially the same thickness steel throughout.

5. The wheel center of claim 3, an upwardly extending lug boss portion formed in the bottom of each lug pocket, and a tapered lug bolt opening pierced and coined in each lug boss.

6. The wheel center of claim 3, said peripheral portion comprising a rim portion extending axially and downwardly, the terminus of said rim portion being located in wheel center bottom plane.

7. The wheel center of claim 3, and a slot formed therein between each two spoke portions and positioned radially between the corresponding lug pocket portion and said peripheral portion.

8. The wheel center of claim 7, said slots being of generally elongated and arcuate configuration and disposed around said hub portion as a center.

9. The wheel center of claim 3, further comprising at least one substantially uniform layer of nickel electroplated over said entire top surface including all of said lug recesses, and at least one substantially uniform layer of chromium electroplated over said at least one layer of nickel.

10. The wheel center of claim 3, wherein the top surfaces of said spoke portions are substantially ripple-free.

* * * * *